United States Patent
Pritchard et al.

(10) Patent No.: US 10,482,234 B2
(45) Date of Patent: Nov. 19, 2019

(54) CONTROLLING AUTHORIZATION WITHIN COMPUTER SYSTEMS

(71) Applicant: ARM IP LIMITED, Cambridge (GB)

(72) Inventors: Andrew Pritchard, Cambridge (GB); Krisztian Flautner, Ann Arbor, MI (US); Hugo John Martin Vincent, Cambridge (GB); Amya Edward Wykes Philips, Cambridge (GB)

(73) Assignee: ARM IP Ltd, Cambridge (GB)

( * ) Notice: Subject to any disclaimer, the term of this patent is extended or adjusted under 35 U.S.C. 154(b) by 215 days.

(21) Appl. No.: 15/107,828

(22) PCT Filed: Dec. 10, 2014

(86) PCT No.: PCT/GB2014/053654
§ 371 (c)(1),
(2) Date: Jun. 23, 2016

(87) PCT Pub. No.: WO2015/097431
PCT Pub. Date: Jul. 2, 2015

(65) Prior Publication Data
US 2016/0328550 A1    Nov. 10, 2016

(30) Foreign Application Priority Data
Dec. 23, 2013    (GB) .................................. 1322870.5

(51) Int. Cl.
*G06F 21/34* (2013.01)
*G06F 21/35* (2013.01)
(52) U.S. Cl.
CPC .............. *G06F 21/35* (2013.01); *G06F 21/34* (2013.01); *G06F 2221/2111* (2013.01)

(58) Field of Classification Search
CPC .......... G06F 21/30; G06F 21/31; G06F 21/34; G06F 21/35; G06F 2221/2111; H04L 63/10; H04L 63/20
See application file for complete search history.

(56) References Cited

U.S. PATENT DOCUMENTS 6,006,333 A * 12/1999 Nielsen ................... G06F 21/41
                                                                709/203
6,484,261 B1    11/2002 Wiegel
(Continued)

FOREIGN PATENT DOCUMENTS

CN        101632094 A        1/2010
EP          2378748 A1       10/2011
(Continued)

OTHER PUBLICATIONS

International Search Report for PCT/GB2014/053654, dated Apr. 4, 2015, 6 pages.

(Continued)

*Primary Examiner* — Khang Do
(74) *Attorney, Agent, or Firm* — Patterson Thuente Pedersen, P.A.

(57) ABSTRACT

Techniques for controlling the provision of data to a requester use a local device communicating with a personal computing device. The personal computing device has an authorized state and an unauthorized state. If the personal computing device is proximal to the local device when the local device receives the request for data from the requester, then the personal computing device uses permission data it stores to determine whether the request is or is not a permitted request. If the request is a permitted request, then the personal computing device sends a message to a token issuing device to issue a token request to the requester. The (Continued)

requester then uses this token to access a third party device holding the data to which it seeks access.

9 Claims, 14 Drawing Sheets

(56) References Cited

U.S. PATENT DOCUMENTS

| | | | |
|---|---|---|---|
| 8,045,961 B2 * | 10/2011 | Ayed | H04B 7/00 455/411 |
| 8,333,317 B2 * | 12/2012 | Buer | G07C 9/00007 235/380 |
| 8,396,452 B1 * | 3/2013 | Matsuoka | G06F 21/35 455/410 |
| 8,527,468 B1 | 9/2013 | Crafford et al. | |
| 8,621,554 B1 | 12/2013 | Yu et al. | |
| 8,646,095 B2 | 2/2014 | Mattox, Jr. et al. | |
| 8,689,311 B2 | 4/2014 | Blinn et al. | |
| 9,294,912 B1 | 3/2016 | Flowerday et al. | |
| 9,325,696 B1 * | 4/2016 | Balfanz | H04L 63/0815 |
| 2002/0073331 A1 | 6/2002 | Candelore | |
| 2003/0103414 A1 * | 6/2003 | Lyon | G04G 17/083 368/10 |
| 2004/0003259 A1 * | 1/2004 | Chang | H04L 63/0428 713/182 |
| 2004/0093224 A1 | 5/2004 | Vanska et al. | |
| 2004/0153908 A1 | 8/2004 | Schiavone et al. | |
| 2005/0010780 A1 | 1/2005 | Kane et al. | |
| 2005/0071773 A1 | 3/2005 | Ivanovic et al. | |
| 2005/0076233 A1 | 4/2005 | Aarts et al. | |
| 2005/0221798 A1 | 10/2005 | Sengupta | |
| 2006/0170530 A1 | 8/2006 | Nwosu | |
| 2006/0288233 A1 | 12/2006 | Kozlay | |
| 2007/0290791 A1 | 12/2007 | Batra | |
| 2008/0027842 A1 | 1/2008 | Suginaka | |
| 2008/0072313 A1 | 3/2008 | Bodlaender | |
| 2008/0148059 A1 | 6/2008 | Shapiro | |
| 2009/0164566 A1 | 6/2009 | Kawai et al. | |
| 2010/0235754 A1 | 9/2010 | Leitheiser | |
| 2010/0251340 A1 | 9/2010 | Martin et al. | |
| 2011/0219427 A1 | 9/2011 | Hito | |
| 2011/0252456 A1 * | 10/2011 | Hatakeyama | G06F 21/604 726/1 |
| 2011/0314539 A1 * | 12/2011 | Horton | G06F 21/35 726/20 |
| 2012/0017266 A1 | 1/2012 | DiChiara et al. | |
| 2012/0071151 A1 | 3/2012 | Abramson et al. | |
| 2012/0075062 A1 | 3/2012 | Osman | |
| 2013/0104243 A1 | 4/2013 | Benedetti et al. | |
| 2014/0040134 A1 | 2/2014 | Ciurea | |
| 2014/0068706 A1 | 3/2014 | Aissi | |
| 2014/0129448 A1 | 5/2014 | Aiglstorfer | |
| 2014/0173752 A1 | 6/2014 | Boelter et al. | |
| 2014/0243046 A1 | 8/2014 | Steely et al. | |
| 2014/0372762 A1 * | 12/2014 | Flautner | H04L 9/3226 713/173 |
| 2015/0035643 A1 | 2/2015 | Kursun | |
| 2015/0172920 A1 * | 6/2015 | Ben Ayed | H04W 12/06 713/172 |
| 2015/0234856 A1 | 8/2015 | Havekes et al. | |
| 2016/0127442 A1 | 5/2016 | Long et al. | |
| 2016/0323317 A1 | 11/2016 | Pritchard et al. | |

FOREIGN PATENT DOCUMENTS

| | | |
|---|---|---|
| GB | 2490310 | 10/2012 |
| GB | 2495704 A | 4/2013 |
| GB | 2521478 A | 6/2015 |
| GB | 2521614 A | 7/2015 |
| WO | WO9739553 A1 | 10/1997 |
| WO | WO01/71462 A2 | 9/2001 |
| WO | WO2004/047398 A1 | 6/2004 |
| WO | WO2005/029890 A1 | 3/2005 |
| WO | WO2008/024454 A1 | 2/2008 |
| WO | WO 2015/097431 A1 | 7/2015 |
| WO | WO2015/097432 A1 | 7/2015 |

OTHER PUBLICATIONS

Written Opinion for PCT/GB2014/053654, dated Feb. 12, 2015, 11 pages.
GB Search Report for GB1322870.5, dated Jun. 20, 2014, 2 pages.
GB Search Report for GB1322870.5, dated Feb. 3, 2015, 1 page.
GB Search Report for GB1322870.5, dated Jan. 14, 2015, 2 pages.
International Search Report for PCT/GB2014/053655, dated Feb. 12, 2015, 3 pages.
Written Opinion for PCT/GB2014/053655, dated Feb. 12, 2015, 9 pages.
Ricky Russell, "Top 4 password manager apps for smartphone" available at: Top 4 Password Manager Apps for Smartphone [Accessed Jan. 12, 2015].
"Password management with Hitachi ID Password Manager" available at: http://hitachi-id.com/landing/password-management.html [Accessed Jan. 12, 2015].
"Password Manager Pro" available at: https://play.google.com/store/apps/details?id=com, manageengine.pmp [Accessed Jan. 13, 2015] See fourth screenprint.
Application and File history for U.S. Appl. No. 15/107,757, filed Jun. 23, 2016. Inventors: Pritchard et al.
PCT International Preliminary Report on Patentability for PCT/GB2014/053654, dated Jul. 7, 2016, 13 pages.
PCT International Preliminary Report on Patentability for PCT/GB2014/053655, dated Jul. 7, 2016, 11 pages.
Office Action dated Sep. 4, 2018 for Chinese Application No. 20140070477.5, 17 pages.
Office Action dated Apr. 3, 2019 for Chinese Application No. 201480070477.5, 7 pages.

\* cited by examiner

Insurance Data  A

Vehicle Data  B

Health Data  C

Request refused

172

CONTROLLING AUTHORIZATION WITHIN COMPUTER SYSTEMS

RELATED APPLICATIONS

The present application is a National Phase entry of PCT Application No. PCT/GB2014/053654, filed Dec. 10, 2014, which claims priority from GB Patent Application No. 1322870.5, filed Dec. 23, 2013, said applications being hereby incorporated by reference herein in their entirety.

TECHNICAL FIELD

The invention relates generally to the field of computer systems. More particularly, the invention relates to the control of authorization within computer systems.

BACKGROUND

Traditional web services that require at least the creation of a unique user identity and the establishment of a shared secret (e.g. password), can be provided such that only those in possession of the shared secret are allowed to access the resources associated with that user identity. In this way, the user can place some degree of trust that the information left in the care of the web service, for example their name, address etc, is only available to themselves and the operator of the web service. Conversely, the web service can build up a history of interactions with each user in order to offer a more personalized service. Also, web services can make different services available to each user, for example based upon the level of subscription paid, with a reasonable expectation that access to each user account is restricted to a single person.

Transactions between users and web services often require the web services to collect further information from the users, for example, credit card details, real name and address, insurance details etc. Additionally, some web services may require access to the user's accounts on other web services, for example LinkedIn may request access to a user's GMail account in order to suggest additional contacts.

While the above activities may be needed to establish relationships and to deliver services via the web, they are repetitive, time consuming and sometimes complicated for the user. Furthermore, the user may also end up with many copies of personal information, such as their address, being held by different web services, which presents a potential security vulnerability. Furthermore, many web service providers would rather not hold personal information. For example, if the web service provider is subject to security attack and this information is inappropriately revealed, liability and reputational damage can be incurred. Many web services only hold information because it is necessary to give an acceptable user experience, e.g. avoiding a user having to re-enter payment or address details for each transaction. Many web services would prefer not to have to store this information, or even have to handle passwords preferring instead to outsource account creation and storage to other organisations, such as Google.

SUMMARY

In an embodiment, a method of controlling provision of data comprises: receiving at a local device a request for data from a requester; detecting if a personal computing device is proximal to said local device, said personal computing device having an authorized state and an unauthorized state; if said personal computing device is in said authorized state, then determining with said personal computing device if said request is a permitted request and (i) if said request is a permitted request, then authorizing said provision of said data from a third party device to said requester; and (ii) if said request is not a permitted request, then not authorizing said provision of said data from said third party device to said requester.

Embodiments described herein, whereby, for example, a requester in the form of a web service can send a request to a local device, such as a PC, and provide a personal computing device of the user that is proximal to the local device and is in an authorized state, and permit the requester to obtain the data required from a third party device, such as a remote server holding personal details of a user. In this way, the user need not be troubled to repeatedly enter data and can authorize the request at the local device by the proximity of their personal computing device in an authorized state to the local device. Furthermore, the local device and the requester can be unburdened, if so desired, from keeping a copy of the data respectively requested so as to more readily obtain the data at a later time from the third party device.

The personal computing device can validate the request with permission data stored in the personal computing device. The user can build up a set of such permission data reflecting their own decisions regarding which requests for data should be authorized and which should not be authorized.

In some embodiments the permission data can indicate that one or more requests is an automatically permitted request. Such automatically permitted requests can be authorized by the personal computing device without requiring any input or confirmation from the user. An automatically-permitted indication can be provided to the user (such as display of an appropriate icon, the making of a characteristic noise, a vibration of the personal computing device, etc) to indicate to the user that the request has been automatically authorized. A user can set up the permission data to indicate that a certain request is automatically authorized if, for example, the data concerned is not security sensitive to the user, the requester is highly trusted or some combination of these or other factors.

The permission data can also be set up to indicate that a request is an optionally authorized request. In this circumstance, the user is provided with a prompt indication which prompts the user of the personal computing device to provide a user input which serves to either authorize the request or not authorize the request. An example of the prompt indication could be the display of an icon indicating the type of data being requested by the requester. The user could then use knowledge of the context of interaction with the local device and knowledge of the requester, together with a view as to the sensitivity of the data requested, to determined whether or not to provide a user input that authorizes that request.

Another possible form of permission data is one that indicates that a request is an unauthorized request. As an example, a user can decide as a matter of policy that a particular requester will never be granted permission to access their data. Another example would be a particular type of data to which a user can only authorize access when the access was initiated by the user rather than being the consequence of a request received from a requester at a local device. An unauthorized-request indication can be displayed to indicate that a request has not been authorized so as to alert a user of potentially inappropriate activity.

It will be appreciated that the personal computing device could authorize the provision of the data in a variety of different ways. One convenient and robust way of providing such authorization is that the personal computing device provides token data to the requester and the requester then uses this token data to establish with the third party that the request is authorized. Thus, the requester, once in possession of the token, can arrange and manage their own negotiation with the third party device for provision of the data authorized by that token.

In order to reduce the processing and complexity burden upon the personal computing device, in some embodiments the personal computing device can provide the token data to the requester by authorizing a token issuing device to send the token data to the requester. This token issuing device can be separate from the personal computing device, such as in the form of a token issuing server connected to the requester via a token-issuing telecommunications connection which also connects the personal computing device with that token issuing server. The token-issuing telecommunications connection can be conveniently in the form of an internet connection.

In some embodiments, the personal computing device can provide the requested information directly from its own data store, having first determined whether to grant the requester permission to access said information.

In some embodiments, the local device can be in the form of a local terminal device, such as a laptop computer or a workstation, and the requester can be in the form of a remote server (e.g. providing a web service) communicating with the personal computing device via the local terminal device. Thus, the personal computing device can be unburdened from having to have a communication capability capable of directly communicating with the requester and instead can have a simpler communication capability to communicate with the local terminal device, which relays communication to further devices.

The personal computing device can have a wide variety of different forms. Similarly, user feedback and interaction between the user and the personal computing device can be provided in different ways, such as vibration, sound etc. However, in some embodiments the personal computing device includes a display screen configured to display user feedback upon the handling of the request. This user feedback can include display of one or more icons indicating respective classes of data within the data specified by the request. These icons can be stored within the personal computing device themselves so as to improve security by avoiding a possibility of spoofing of icons. The icons can be such that they are readily recognised by and familiar to a user so as to indicate to the user in a consistent manner the content of data being requested by a requester. A request can specify a variety of different forms of data and accordingly a series of icons can be displayed, e.g. a request can include personal identification data, financial key data, health data etc and icons indicating these different types of data can be displayed in sequence or together to a user so that they can either be informed that an automatic authorization has taken place or optionally authorise the request based upon their own decision as to whether or not to proceed.

The third party device which stores the data which is requested can be remote from both the personal computing device and the requester. The third party device can be connected to the requester via a third party telecommunications connection, such as the internet. In this way, the actual storage of sensitive data can be concentrated in high security and well managed trusted third party devices with both the user of the personal computing device and the requester being unburdened from the demands of protecting such data during its long term storage.

It will be appreciated that the data requested can take a wide variety of different forms, some of which are discussed above. The present techniques are well suited to embodiments in which the data requested is personal information such as contact details, photographs, energy logs, driving licence details and so on.

In an embodiment, a computing system for controlling provision of data comprises: a local device; and a personal computing device having an authorized state and an unauthorized state; wherein said local device comprises: receiving circuitry configured to receive a request for data from a requester; detecting circuitry configured to detect if said personal computing device is proximal to said local device; and transmitting circuitry configured to transmit said request to said personal computing device if said personal computing device is proximal to said local device; and said personal computing device comprises: state determining circuitry configured to determine if said personal computing device is in said authorized state; and permission determining circuitry configured to determine, if said personal computing device is in said authorized state, if said request is a permitted request and (i) if said request is a permitted request, then to authorize said provision of said data from a third party device to said requester; and (ii) if said request is not a permitted request, then not to authorize said provision of said data from said third party device to said requester.

In another embodiment, a computing system for controlling provision of data comprises: local processing means for performing local processing; and personal computing means for performing further processing, said personal computing means having an authorized state and an unauthorized state; wherein said local processing means comprises: receiving means for receiving a request for data from a requester; detecting means for detecting if said personal computing device is proximal to said local device; and transmitting means for transmitting said request to said personal computing means if said personal computing device is proximal to said local processing means; and said personal computing means comprises: state determining means for determining if said personal computing means is in said authorized state; and permission determining means for determining, if said personal computing means is in said authorized state, if said request is a permitted request and (i) if said request is a permitted request, then to authorize said provision of said data from a third party device to said requester; and (ii) if said request is not a permitted request, then not to authorize said provision of said data from said third party device to said requester.

In another embodiment, a method of controlling provision of data comprises: storing within a terminal device one or more instances of login data within a login data store having a locked state and an unlocked state; receiving a request for a target instance of login data from a requester and, if said login data store is in said unlocked state and said target instance of login data is stored within said login data store, then automatically providing said target instance of login data to said requester without requiring any user input; detecting if a personal computing device is proximal to said terminal device, said personal computing device having an authorized state and an unauthorized state; if said personal computing device is proximal to said terminal device, said personal computing device is in said authorized state and said login data store is in said locked state, then switching said login data store from said locked state to said unlocked state; and if said personal computing device is not proximal to said terminal device and said login data store is in said unlocked state, then switching said login data store from said unlocked state to said locked state.

In some embodiments a terminal device can include a login data store storing one or more instances of login data and having both a locked state and an unlocked state. Such a login data store can be password protected in itself and regarded as a keychain for storing a plurality of keys for use in logging in to various systems or services. In order to unburden the user from repeatedly having to authorize login data to be accessed from the login data store, the present technique uses the proximity of a personal computing device when the personal computing device is in its authorized state to unlock the login data store so that the data store can then respond to a request for an instance of login data received from a requester. If the personal computing device moves out of proximity with the terminal device, then the login store is switched back from its unlocked state to its locked state so as to preserve security.

Security is further guarded if, when the personal computing device is proximal to the terminal device and the login data store is in its unlocked state, should the personal computing device switch from its authorized state to its unauthorized state, then the login data store is switched from its unlocked state to its locked state. Thus, for example, should the authorized state of the personal computing device time out, or the continued physical possession of the personal computing device by the user not continue, then the personal computing device will switch to its unauthorized state and the login data store will be locked to prevent inappropriate access.

The proximity of the personal computing device to the terminal device can be detected using two-way wireless communication therebetween in association with a threshold level of communication strength (which can be measured in a variety of different ways and be required in either or both directions). A proximity metric can be determined based on the wireless signals as raw signal strength data can be less reliable.

The switching of the personal computing device from its unauthorized state to its authorized state can be achieved by requiring a predetermined input from a user. Once the predetermined input has been received and the personal computing device is in its authorized state, then the personal computing device can serve to monitor its continued physical possession by the user and switch back to the unauthorized state if such continued physical possession does not persist.

The predetermined input from the user used to switch the personal computing device from the unauthorized state to the authorized state can take a wide variety of different forms, such as the input of a password by the user, the recognition of a user's fingerprint or the recognition of some other biometric parameter associated with the user.

The convenience and usability of the present techniques can be enhanced when the personal computing device is a wearable computing device attached to the user by an attachment mechanism having an open state and a closed state. In this context, the step of detecting if the personal computing device remains in the physical possession of the user can comprise detecting that the attachment mechanism remains in its closed state. As an example, if the wearable computing device is a watch having a watch strap and the attachment mechanism is a mechanism for closing the watch strap, then the continued physical possession of the watch by the user can be monitored by determining that the mechanism for closing the watch strap remains closed subsequent to the watch being placed into its authorized state.

The login data can comprise user identifiers and associated passwords as well as potentially further information as can be desired or appropriate.

In another embodiment, a terminal device for controlling provision of data comprises: a login data store configured to store one or more instances of login data and having a locked state and an unlocked state; receiving circuitry configured to receive a request for a target instance of login data from a requester and, if said login data store is in said unlocked state and said target instance of login data is stored within said login data store, then automatically to provide said target instance of login data to said requester without requiring any user input; detecting circuitry configured to detect if a personal computing device is proximal to said terminal device, said personal computing device having an authorized state and an unauthorized state; switching circuitry configured: (i) if said personal computing device is proximal to said terminal device, said personal computing device is in said authorized state and said login data store is in said locked state, then to switch said login data store from said locked state to said unlocked state; and (ii) if said personal computing device is not proximal to said terminal device and said login data store is in said unlocked state, then to switch said login data store from said unlocked state to said locked state.

In another embodiment, a terminal device for controlling provision of data comprises: login data store means for storing one or more instances of login data and having a locked state and an unlocked state; receiving means for receiving a request for a target instance of login data from a requester and, if said login data store means is in said unlocked state and said target instance of login data is stored within said login data store means, then automatically to provide said target instance of login data to said requester without requiring any user input; detecting means for detecting if a personal computing device is proximal to said terminal device, said personal computing device having an authorized state and an unauthorized state; switching means for: (i) if said personal computing device is proximal to said terminal device, said personal computing device is in said authorized state and said login data store is in said locked state, then switching said login data store from said locked state to said unlocked state; and (ii) if said personal computing device is not proximal to said terminal device and said login data store is in said unlocked state, then switching said login data store from said unlocked state to said locked state.

In another embodiment, a method of controlling provision of data comprises: sending a request for said data from a requester to a personal computing device; receiving said request at said personal computing device; determining with said personal computing device if said request is a permitted request and (i) if said request is a permitted request, then authorizing said provision of said data from a third party device to said requester; and (ii) if said request is not a permitted request, then not authorizing said provision of said data from said third party device to said requester; and indicating with an indicating device of said personal computing device an indication of what data has been requested by said requester.

Security can be enhanced in embodiments in which the personal computing device receives a request from a requester for data and then either permits or does not permit that request accompanied by providing an indication with an indicating device of a personal computing device of what data has been requested by the requester. The provision of such feedback to the user of the nature of the data being requested provides a "back channel" of communication to the user which enhances security and improves the confidence of the user in the personal computing device in managing their data. The user is kept informed of at least which types of data are being authorized for access and/or requested.

In another embodiment, a personal computing device for controlling provision of data comprises: receiving circuitry configured to receive a request for said data from a requester; determining circuitry configured to determine if said request is a permitted request and (i) if said request is a permitted request, then authorizing said provision of said data from a third party device to said requester; and (ii) if said request is not a permitted request, then not authorizing said provision of said data from said third party device to said requester; and an indicating device configured to provide an indication of what data has been requested by said requester.

In another embodiment, a personal computing device for controlling provision of data comprises: receiving means for receiving a request for said data from a requester; determining means for determining if said request is a permitted request and (i) if said request is a permitted request, then authorizing said provision of said data from a third party device to said requester; and (ii) if said request is not a permitted request, then not authorizing said provision of said data from said third party device to said requester; and indicating means for providing an indication of what data has been requested by said requester.

BRIEF DESCRIPTION OF THE DRAWINGS

Embodiments will now be described, by way of example only, with reference to the accompanying drawings in which.

DETAILED DESCRIPTION OF THE DRAWINGS

Figure 1:
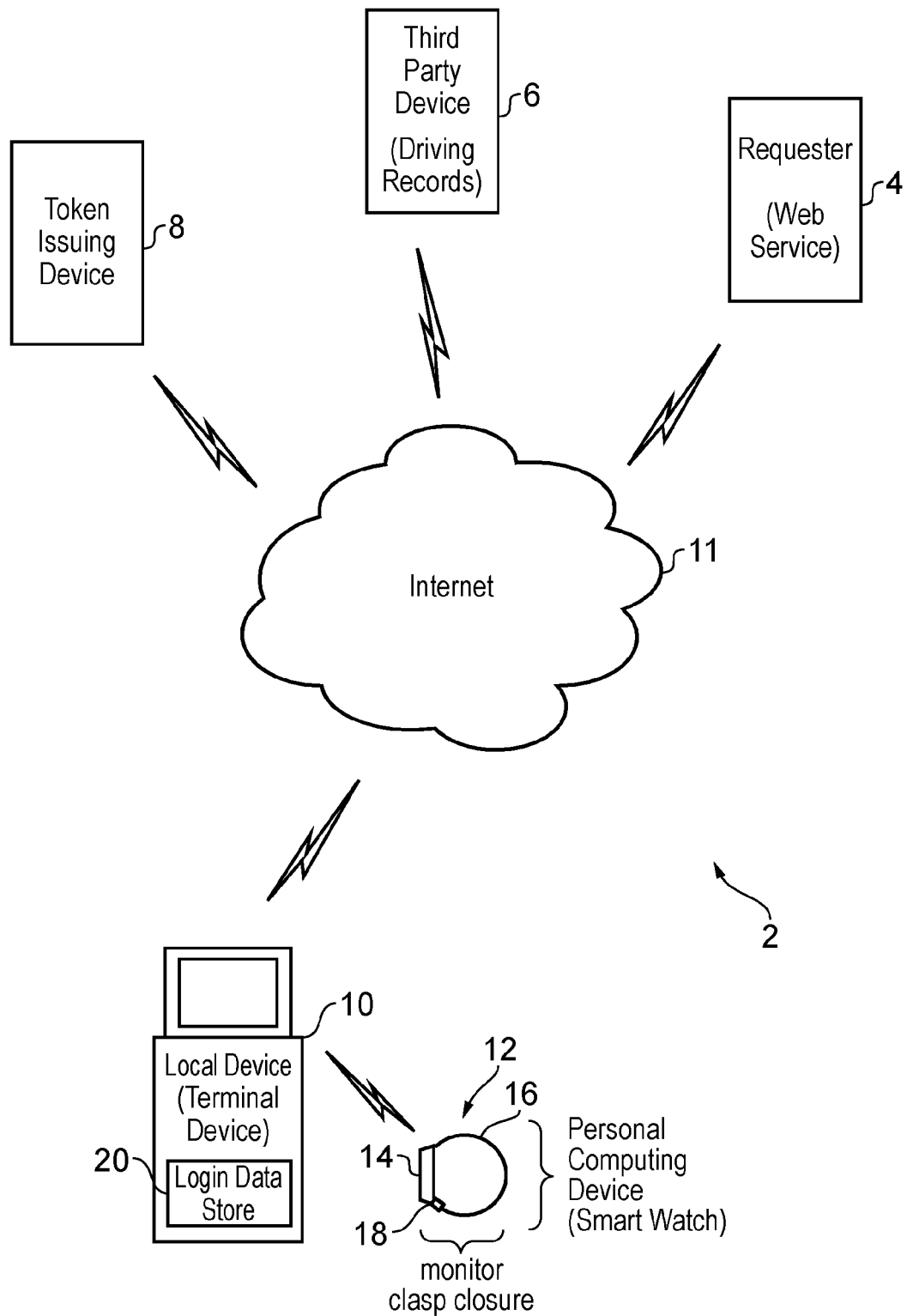
FIG. 1 is a block diagram of a computer system including a personal computing device, a local device, a requester, a third party device and a token issuing device.

FIG. 1 is a block diagram of a computer system 2 including a requester 4, which provides a web service, a third party device 6, which provides, for example, driving records, a token issuing device 8 and a local device 10 all communicating via the internet 11 which serves as both a token-issuing telecommunications connection and a third-party telecommunications connection. A personal computing device 12 in the form of a smart watch having a watch body 14, a strap 16 and a clasp 18 is in two-way wireless communication with the local device 10 when proximal thereto. The closure of the clasp 18 is monitored by the smart watch 12 such that if the clasp 18 is opened so that the watch can be removed from a user's arm, then this is detected by the smart watch 12 and serves to switch the smart watch 12 from an authorized state to an unauthorized state.

The local device 10 can be a desktop personal computer, a laptop computer, a workstation or some other form of device. The local device 10 includes a login data store 20 which stores a plurality of items of login data. The login data includes user identifiers and associated passwords for different websites and web services as well as other associated data as necessary. The login data store serves as a "keyring" for the login data and the login data store can be in either a locked state or an unlocked state. When the login data store is in an unlocked state, then login data is automatically provided from the login data store to the requester 4. This behavior using the login data store 20 will be described further below.

The personal computing device 12 is in two-way wireless communication with the local device 10. The communication can use low energy Bluetooth radio connections (BLE). The radio connections can be adapted so as to detect the proximity of the personal computing device 12 to the local device 10. This proximity can be compared with a threshold level of proximity so as to control aspects of the operation of a local device 10 as will be described further below. The proximity can be determined based upon a proximity metric which is determined based upon the wireless signal.

Figure 2:
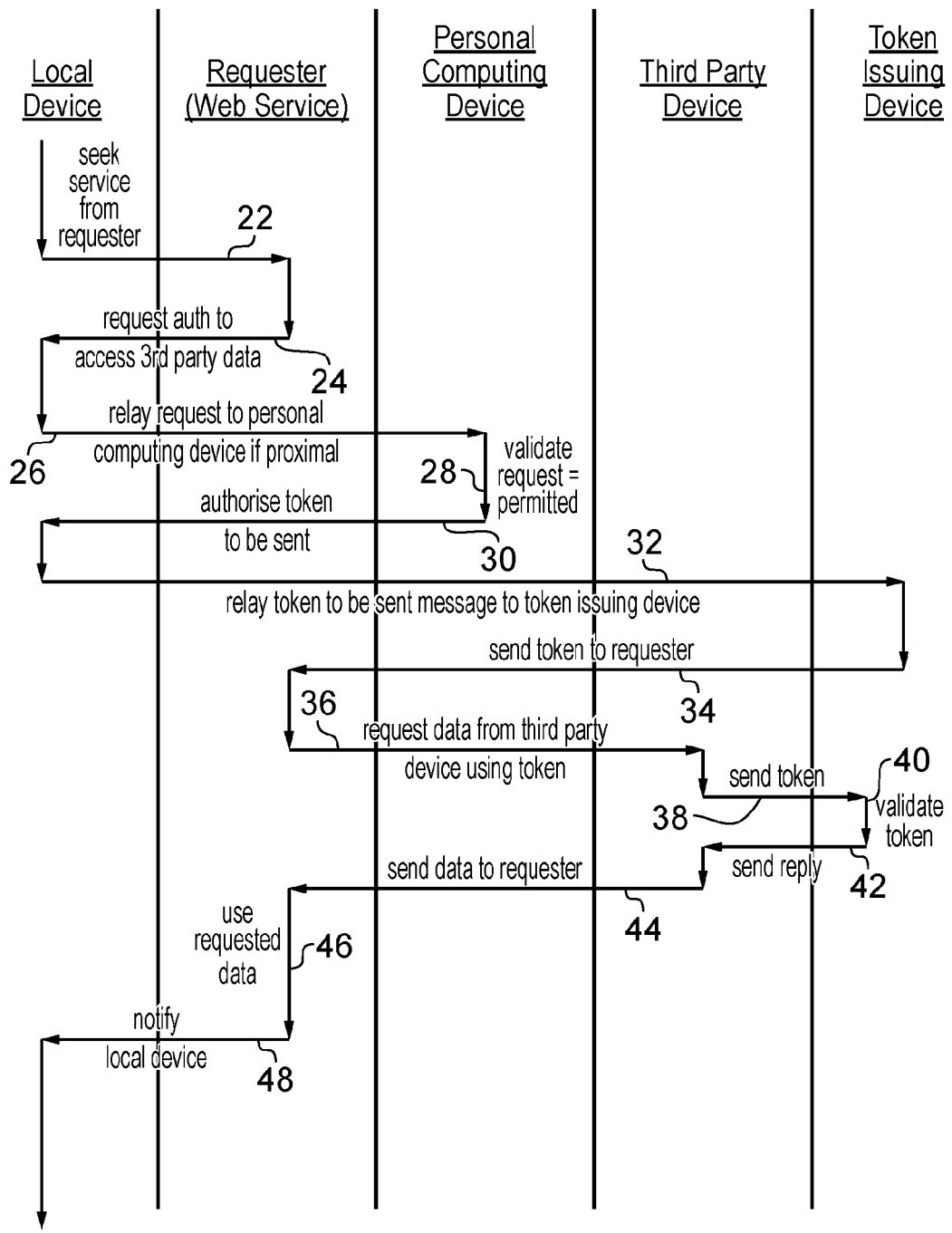
FIG. 2 is a block diagram of an example of communication between the various entities in FIG. 1.

In FIG. 2, a block diagram of an example of the communication between the local device 10, the requester 4, the personal computing device 12, the third party device 6 and the token issuing device 8 is illustrated. This communication arises as a consequence of the local device 10 seeking a service from the requester 4, such as seeking to access a web based service, such as car rental. When the local device 10 seeks the service from the requester 4, the local device 10 can request display of a webpage which indicates that the requester 4 requires some data to be supplied in order that the requester 4 can provide the web service. As an example, the requester 4 can require personal identity and address details, or driving records, from a user in order to complete an online car rental booking. At step 22 in FIG. 2 the local device 10 communicates with the requester 4. At step 24 the requester 4 sends a request to authorize a data access to third party data held by the third party device 6 back to the local device 10. As an example, the third party device 6 can store driving records for the individual seeking to make a car rental. At step 26, the local device 10 which receives the request from the requester 4 via the internet 12 serves to relay the request to the personal computing device 12 via the short range Bluetooth wireless communication with the personal computing device 12. At step 28, the personal computing device 12 serves to validate the received request and determine whether that request is permitted or not permitted. If the request is permitted, then steps 30 and 32 send a message to the token issuing device 10 that a token for authorizing access is to be sent from the token issuing device 8 to the requester 4 at step 34. This token permits the requester 4 to send a request for data to the third party device at step 36. The third party device 6 then forwards the token received from the requester 4 to the token issuing device 8 at step 38. The token issuing device at step 40 validates this token and, if valid, sends a reply at step 42 to the third party device 6 indicating that the token is valid. Upon receipt of such a message indicating that the token is valid, the third party device 6 at step 44 sends the data that was requested to the requester 4, e.g. sends the driving records for the owner of the personal computing device 12. At step 46, the requester 4 uses the requested data, such as by checking that the user has a satisfactory driving record, to permit them to rent a car. At step 48 a notification is sent to the local device that the requester 4 has received and used the data from the third party device 6.

Access tokens are used by a client to prove that the client has prior authorization from an authenticating party to a perform actions on a validating party, typically a resource server. Access tokens can take many forms, for example API keys or OAuth tokens, but generally fall in to one of two categories.

Bearer tokens can contain lists of permissions and describe the conditions under which such tokens are granted. For example until a certain date, these particulars or a digest of them being signed by the issuer using their private key such that the validating party, being in possession of the issuer's public key, can assure itself that the token was indeed issued by said issuing party. Security tokens can be validated directly by the validating party without recourse to any other party.

Security tokens are simply strings of characters, long enough to be difficult to guess correctly. In general, security tokens should only be passed over encrypted connections to authenticated parties. Security tokens can be accompanied by further information, such as the identity of the issuer. An API request containing such a key will be accepted by the party receiving the request provided the request is permitted by the permissions associated with the token. The permissions can be changed or revoked at any time. Third parties can issue tokens provided the third party either apprises the receiving party of each new token before the new token is first used, or the receiving party accepts validation requests to validate the keys on behalf of the receiving parties.

Figure 3:
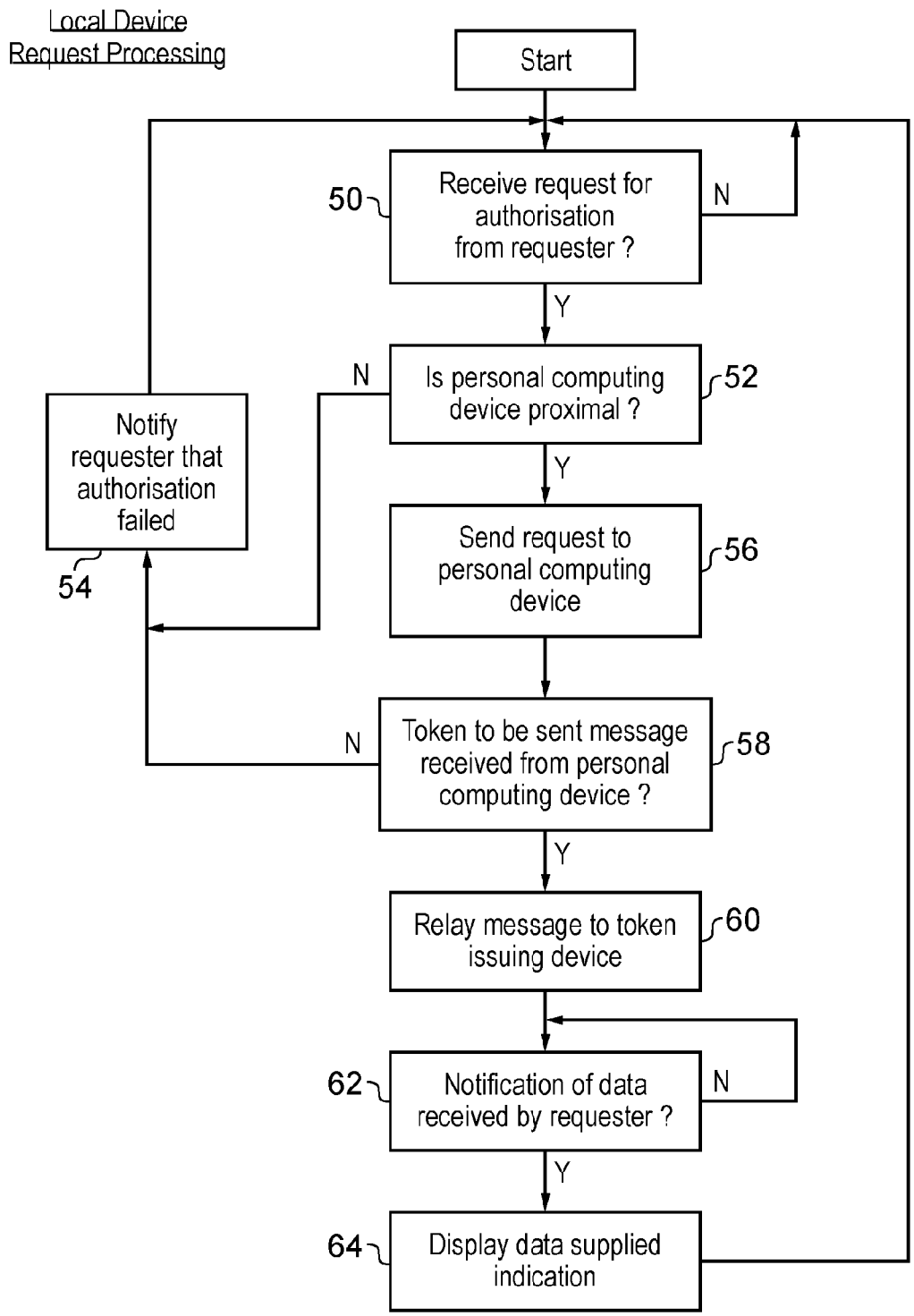
FIG. 3 is a flow diagram schematically illustrating request processing by the local device.

FIG. 3 is a flow diagram schematically illustrating request processing by the local device 10. At step 50 processing waits until a request for authorization is received from a requester 4. At step 52 a determination is made by the local device 10 based upon comparing the signal strength for two-way communication with the personal computing device 12 with a threshold level in order to determine whether or not the personal computing device 12 is proximal to the local device 10. If the personal computing device 12 is not proximal to the local device 10, then step 54 serves to notify the requester 4 that the authorization has failed. If the determination at step 52 is that the personal computing device 12 is proximal to the local device 10, then step 56 serves to send the request from the local device 10 to the personal computing device 12.

At step 58, the local device 10 waits to receive a message from the personal computing device 12 as to whether or not a message is to be sent to the token issuing device 8 indicating that the token issuing device should issue a token to the requester 4. If the message received at step 58 is that the token issuing device 8 should not send a token to the requester 4, then processing proceeds to step 54 and the requester 4 is notified that the authorization has failed. If the message received at step 58 is that a message is to be sent to the token issuing device 8, then step 60 serves to relay such a message from the personal computing device 12 to the token issuing device 8. Processing then waits at step 62 for notification from the requester 4 that the requester 4 has received its data following a successful interaction with the token issuing device 8 and the third party device 6. When such a notification is received, then step 64 serves to display on the local device an indication of what data has been supplied.

Figure 4:
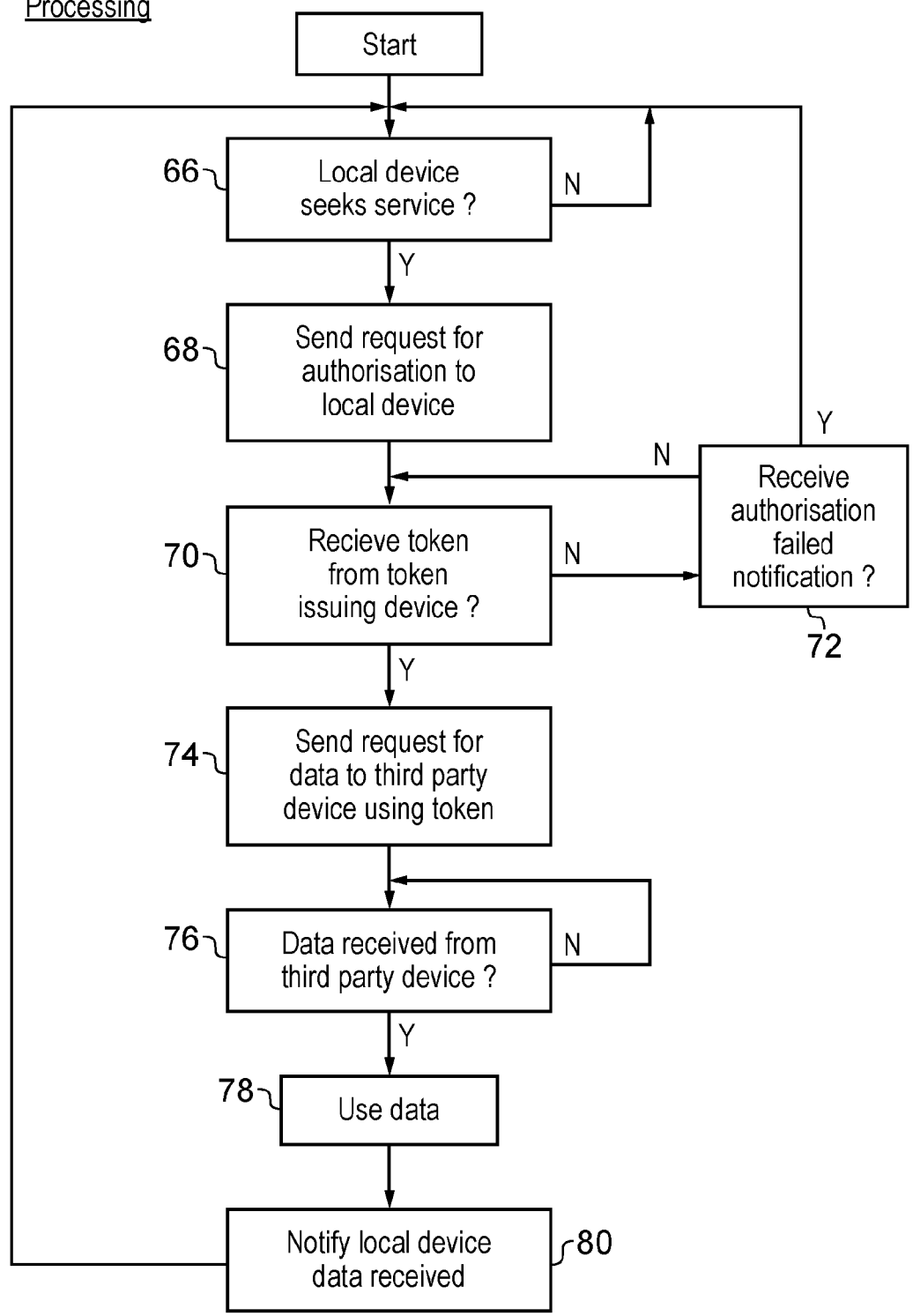
FIG. 4 is a flow diagram schematically illustrating request processing by the requester.

FIG. 4 is a flow diagram schematically illustrating request processing by the requester 4. Processing waits at step 66 until a local device 10 requests a service from the requester 4. At step 68 the requester 4 sends a request for authorization for data needed to fulfill the service to the local device 10. Processing then proceeds through steps 70 and 72 to identify that either a token has been received from the token issuing device 8 to be used to perform the access or that an authorization failed notification has been received. If an authorization failed notification is received, then processing proceeds to step 66 and the service requested is denied. If a token is received from the token issuing device at step 70, then processing proceeds to step 74 where the requester 4 sends a request for the data being sought to the third party device 6 accompanied with the token received from the token issuing device 8. The requester 4 then waits at step 76 for the data to be received from the third party device 6. When the data is received, step 78 uses this data, such as ensuring that a driver has an appropriate driving record for the car rental being set up, and processing then proceeds to step 80 where a message is sent to the local device 10 to notify the local device that the data has been received.

Figure 5:
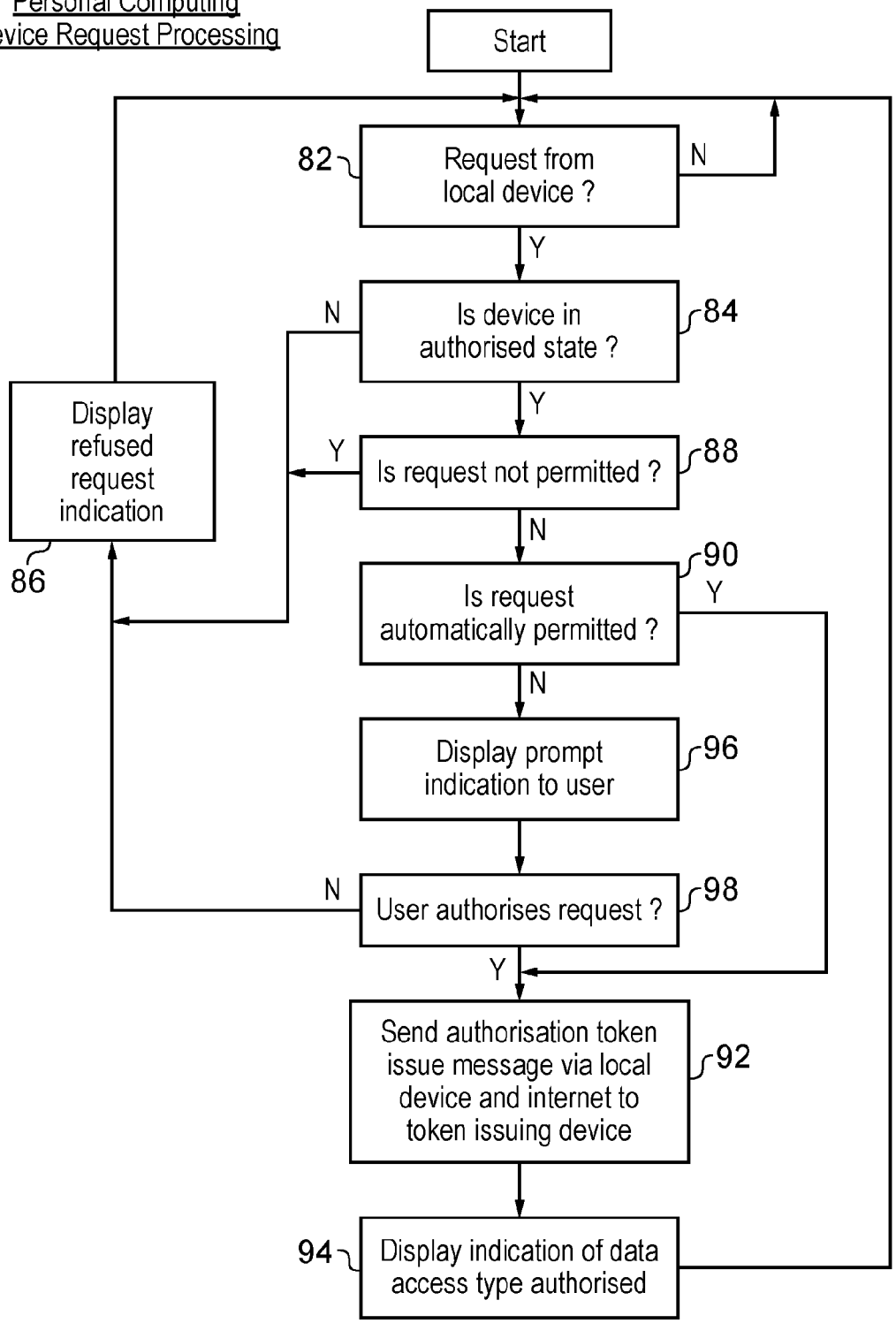
FIG. 5 is a flow diagram schematically illustrating request processing by the personal computing device.

FIG. 5 is a flow diagram schematically illustrating request processing performed by the personal computing device 12. At step 82 the personal computing device 12 waits for a request to be received from the local device 10. When such a request is received, then step 84 determines whether or not the personal computing device 12 is currently in its authorized state or its unauthorized state. If the personal computing device 12 is in its unauthorized state, then processing proceeds to step 86 where a refused request indication is displayed by the personal computing device 12 and processing returns to step 82.

If the determination at step 84 is that the personal computing device 12 is in its authorized state, then step 88 determines whether or not the request is a permitted request. This can be achieved by comparing the request with permission data stored within the personal computing device 12. This permission data can indicate different types of data which are permitted to be its authorized for distribution and/or different requesters who can be its authorized in respect of different types of data or individual items of data or combinations of the preceding. It will be appreciated that the permission data can include a wide variety of different forms.

If the determination at step 88 is that the request is not permitted, then processing again proceeds to step 86. If the determination at step 88 is that the request is permitted, then processing proceeds to step 90 where a determination is made as to whether or not the request is one classified as automatically permitted. If the request is automatically permitted, then processing proceeds to step 92 where a message to send an authorization token is sent to the token issuing device 8 via the local device 10. Step 94 then displays an indication on the personal computing device of the type of data access that has been authorized. This indication can be, for example, in the form of displaying an associated type of icon indicating the nature of the data for which authorization has been granted.

If the determination at step 90 is that the request is not an automatically permitted request, then step 96 displays a prompt indication to the user of the personal computing device so as to prompt the user to make a user input to either authorize the request or not authorize the request. The user input can, for example, press a button to indicate that the request is either authorized or not authorized, enter a personal identification number to authorize a request, tap an icon on a screen to authorize a request or some other predetermined user input. Step 98 determines from the user input whether or not the request is authorized. If the request is not authorized, then processing proceeds to step 86. If the request is authorized, then processing proceeds to step 92.

Figure 6:
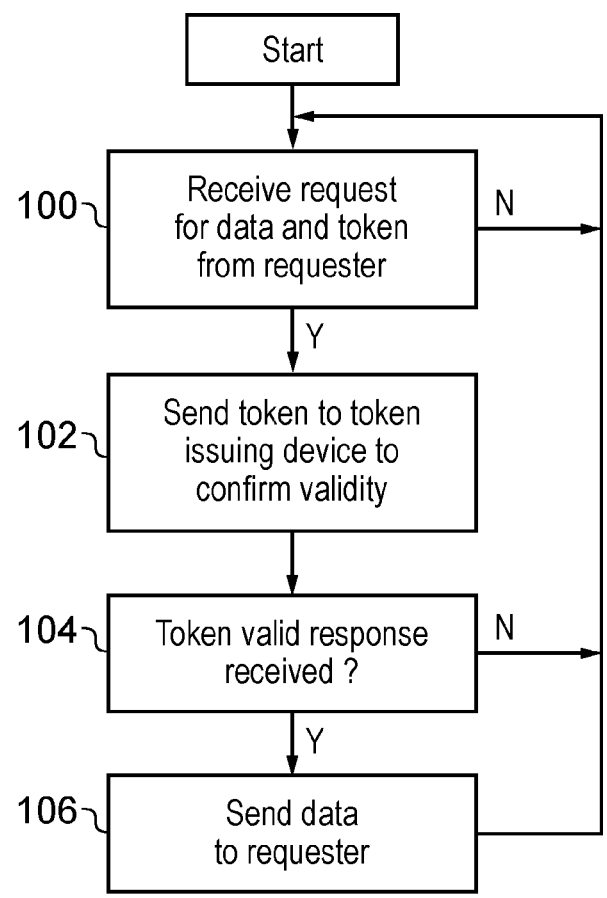
FIG. 6 is a flow diagram schematically illustrating request processing by the third party device.

FIG. 6 is a flow diagram schematically illustrating request processing performed by the third party device 6. At step 100 the third party device 6 waits until a request for data and an associated token is received from the requester 4. When such a request and token are received, then step 102 sends the token to the token issuing device 8 associated with that token. Step 104 then waits until a token response is received and determines whether this token response is a token valid response. If the token response was a token valid response, then step 106 sends the data requested to the requester 4. If the token response was not that the token is valid, then processing returns to step 100.

Figure 7:
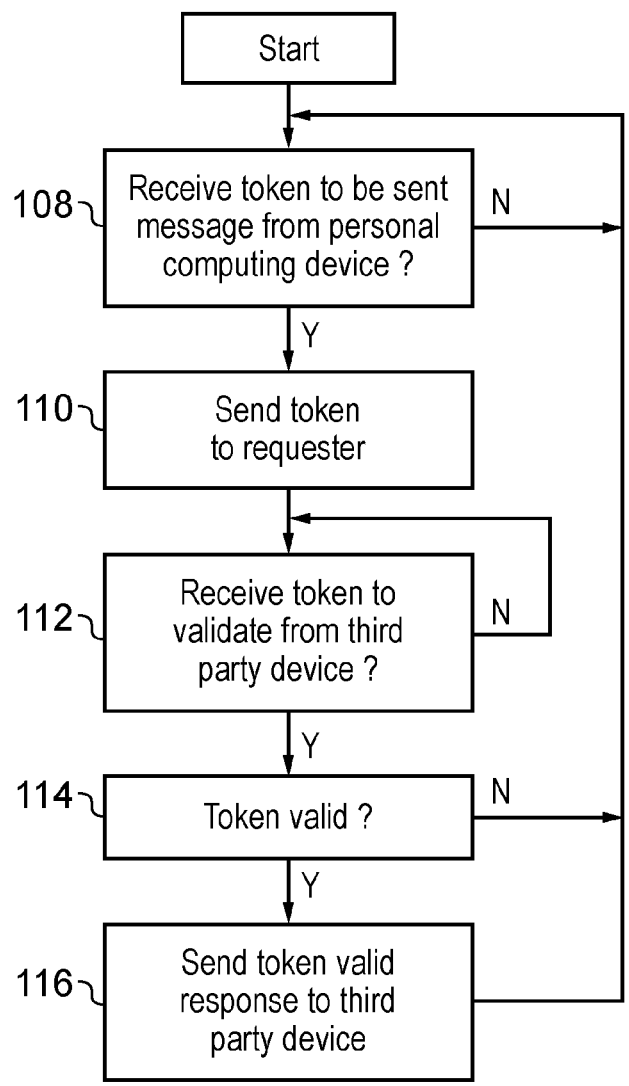
FIG. 7 is a flow diagram schematically illustrating request processing by the token issuing device.

FIG. 7 is a flow diagram schematically illustrating request processing by the token issuing device 8. At step 108 processing waits until a message is received from the personal computing device 12, as relayed by the local device 10, that a token authorizing access should be sent to the requester 4. When such a message is received at step 108, step 110 sends the associated token from the token issuing device 8 to the requester 4. At step 112, the token issuing device, at least in association with the token that has been issued, waits to receive back from a third party device 6 the token sent to the requester 4 in order to validate that token. When a candidate token is received, step 114 determines whether or not the candidate token is valid. If the token is valid, then processing proceeds to step 116 at which a token valid response is sent to the third party device 6, which will in turn authorize the third party device 6 to send the requested data to the requester 4. If the determination at step 114 is that the token is not valid, then processing proceeds to step 108.

Figure 8:
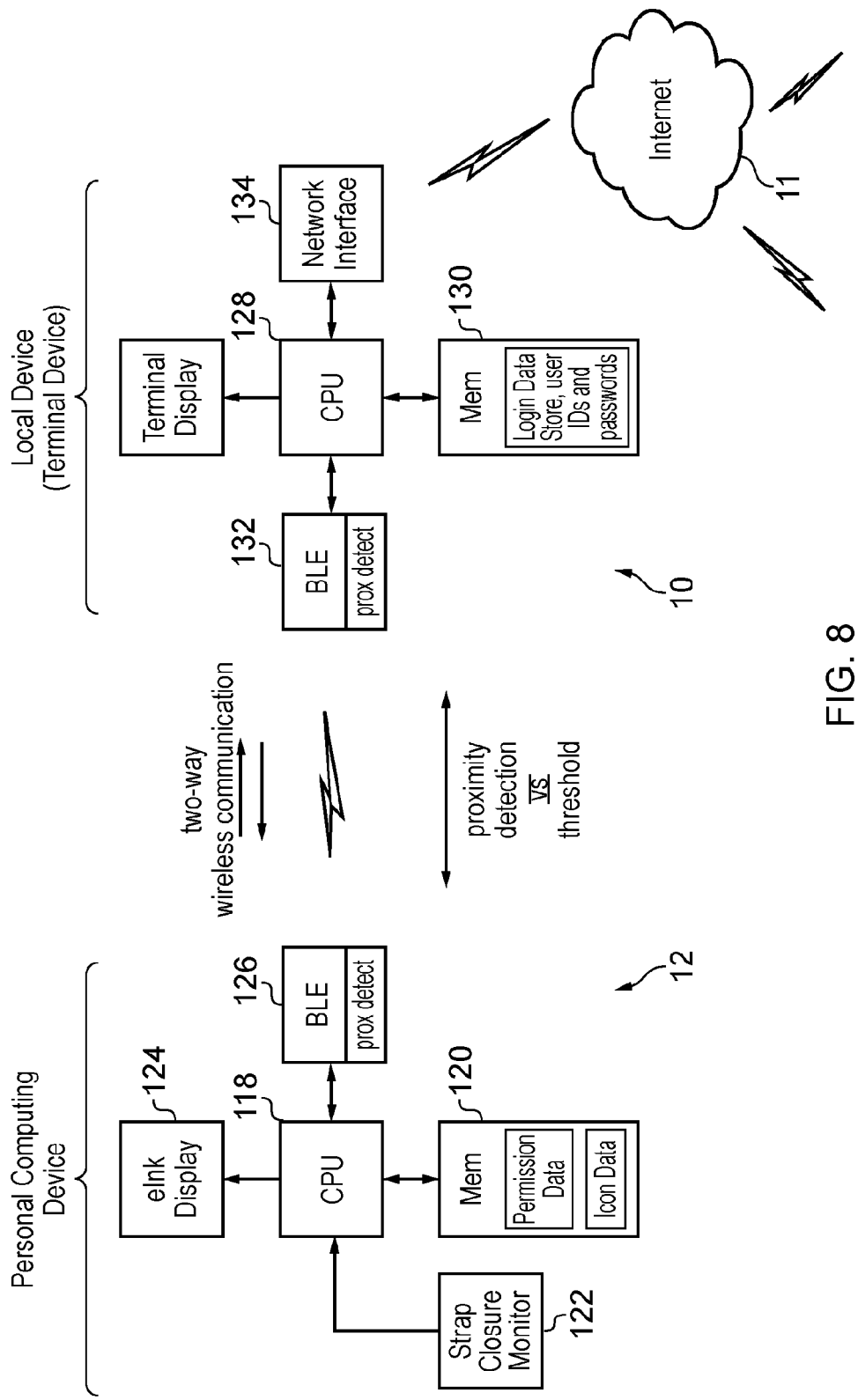
FIG. 8 is a block diagram of interaction between the personal computing device and the local device.

FIG. 8 is a block diagram of the interaction between the personal computing device 12 and the local device 10. The personal computing device 12 includes a processor 118, a memory 120, a strap closure monitoring circuit 122, a display 124 and a Bluetooth Low Energy Transmitter/Receiver circuit 126. The memory 120 stores permission data specifying which requests will and will not be authorized, and whether or not those requests are automatically authorized or are optionally authorized requests. Optionally authorized requests require a predetermined user input following display of a prompt indication in order to authorize the data to which the requests relate to be released. The memory 120 also stores icon data defining icons which are displayed to indicate which types of data are being authorized to be released (or requested) as will be described later. The Bluetooth circuit unit 126 includes signal strength monitoring circuitry which serves to detect the proximity of the local device 10 to the personal computing device 12. This proximity can be compared with a threshold level of proximity in order to determine, at least in part, whether the personal computing device 12 is proximal to the local device 10.

According to embodiments, the memory 120 stores a computer program that is executed by the processor 118. Such a processor 118 operating under program control can serve as, for example, state determining circuitry for determining whether or not the personal computing device 12 is in an authorized state, permission determining circuitry for comparing a received request with the stored permission data and circuitry serving to either authorize or not authorize provision of data from the third party device 6 to the request 4 in accordance with the above discussions. In general, the processor 118 operating under program control, as well as other processors within the system, can providing provide various forms of circuitry for performing specified functions. As will be familiar to those in this technical field, particular specified functions can be performed either with a program general purpose processor or with dedicated circuitry depending upon the design requirements. Circuitry for performing the various functions described herein can be provided in any suitable manner.

The local device 10, which can be a terminal device in the form of a personal computer, includes a processor 128, a memory 130, a Bluetooth Low Energy Transmitting/Receiver circuit 132 for communicating with the personal computing device 12, and a network interface 134 for communicating with the internet 11. The memory 130 stores a login data store comprising a list of usernames and passwords associated with different websites or web services. This login data store can take the form of a password keyring which is either locked or unlocked. When the login data store is unlocked, then if the local device 10 accesses a webpage or web service that requires a password to be entered, then if this password is present within the unlocked login data store, the username and password are automatically provided so as to unburden the user from the need to perform this task. The same process can also be applied to logging on to a computer itself. In many embodiments, the process can be seamless such that the login process takes place without any user intervention.

Figure 9:
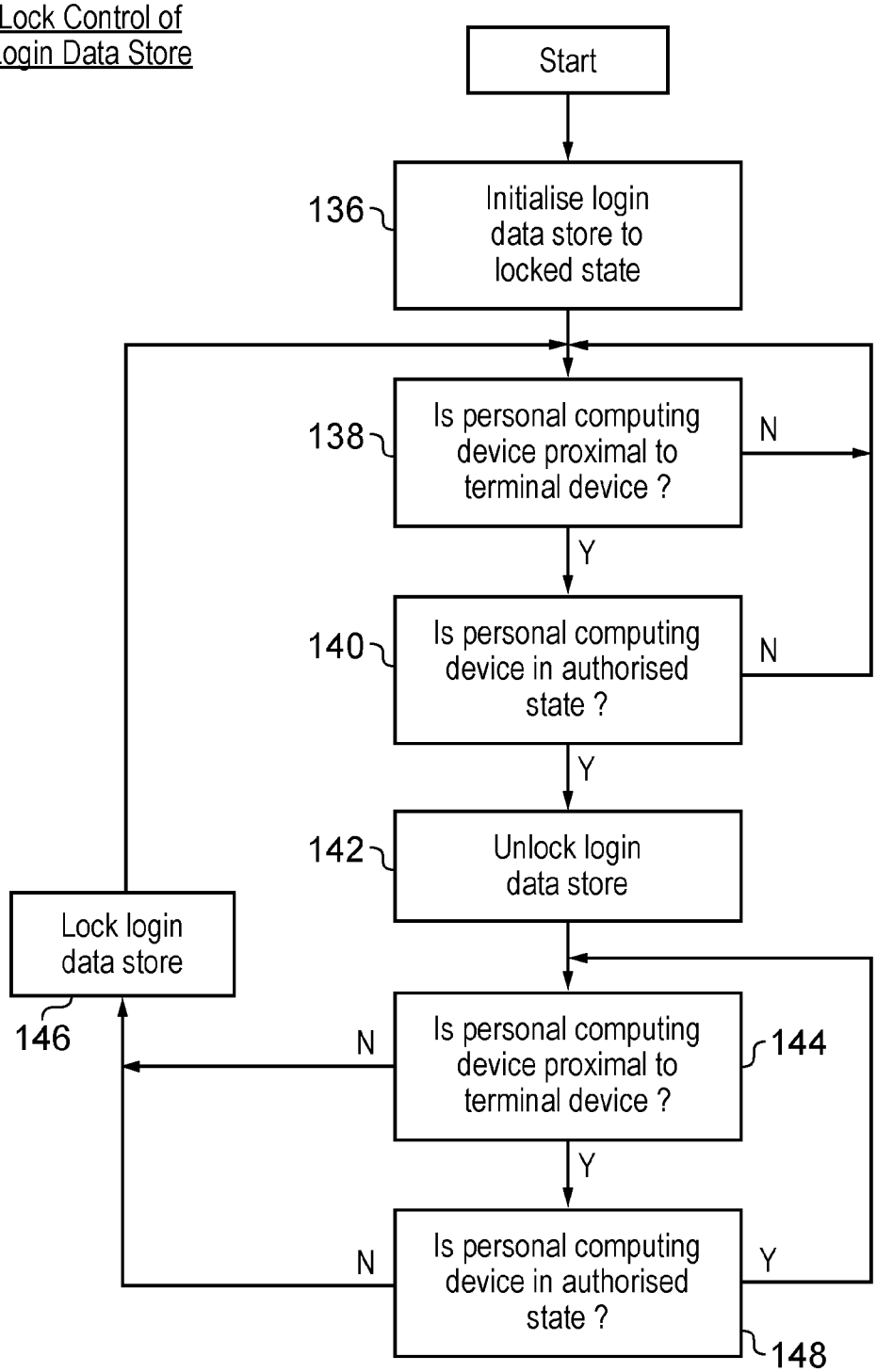
FIG. 9 is a flow diagram schematically illustrating lock control of a login data store.

FIG. 9 is a flow diagram schematically illustrating lock control of the login data store by the local device 10. At step 136 the login data store is initialized into a locked state. At step 138 a determination is made as to whether or not the personal computing device 12 is proximal to the local device (terminal device) 10. If the personal computing device is not proximal to the terminal device 10, then processing waits at step 138. When the personal computing device 12 becomes proximal to the terminal device 10, then processing proceeds to step 140 where a determination is made as to whether or not the personal computing device is in its authorized state. The personal computing device 12 reports this state to the terminal device 10. If the personal computing device is not in its authorized state, then processing again returns to step 138. If the personal computing device 12 is in its authorized state, then step 142 serves to switch the login data store into its unlocked state. Step 144 then determines whether or not the personal computing device remains proximal to the terminal device 10. If the personal computing device 12 is not proximal to the terminal device 10, then step 146 serves to switch the login data store from its unlocked state to its locked state. If the determination at step 144 is that the personal computing device 12 remains proximal to the terminal device 10, then step 148 also serves to determine that the personal computing device 12 remains in its authorized state before returning to step 144. If the personal computing device 12 is not in its authorized state, then processing again proceeds to step 146. Accordingly, steps 144 and 148 in combination serve to maintain the login data store in the unlocked state providing the personal computing device 12 remains proximal to the terminal device 10 and the personal computing device 12 remains in its authorized state.

Figure 10:
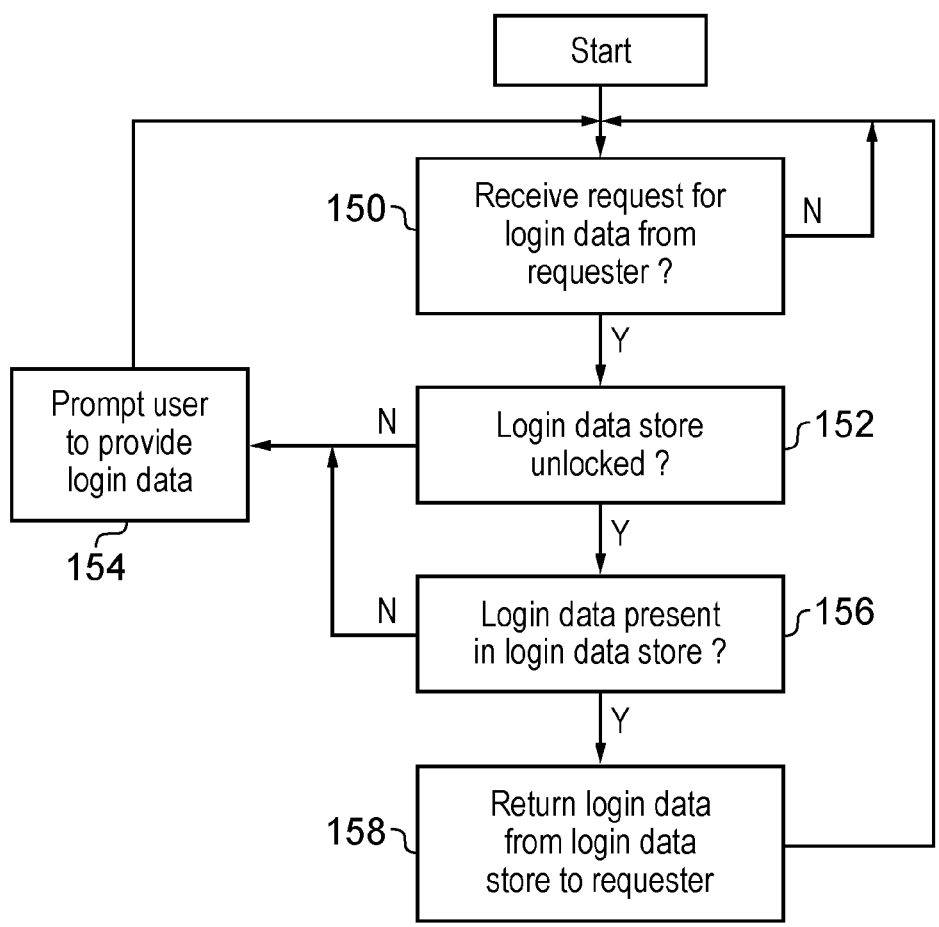
FIG. 10 is a flow diagram schematically illustrating login data provision by the terminal device (local device)

FIG. 10 is a flow diagram schematically illustrating login data provision by the terminal device 10. At step 150 processing waits until the terminal device 10 receives a request for login data from a requester 4. Step 152 determines whether the login data store is in its unlocked state. If the login data store is not in its unlocked state, then processing proceeds to step 154 where the user is prompted to provide manually the login data requested. If the determination at step 152 is that the login data store is unlocked, then step 156 accesses this login data and determines whether or not the login data store contains the login data being requested at step 150. If the login data store does not contain the requested login data, then processing again proceeds to step 154. If the determination at step 156 is that the login data store does contain the requested login data, then step 158 serves to return this login data to the requester 4 without requiring user input by the user. An indication that such login data had been automatically provided can be displayed to the user via the terminal device 10 and/or the personal computing device 12.

Figure 11:
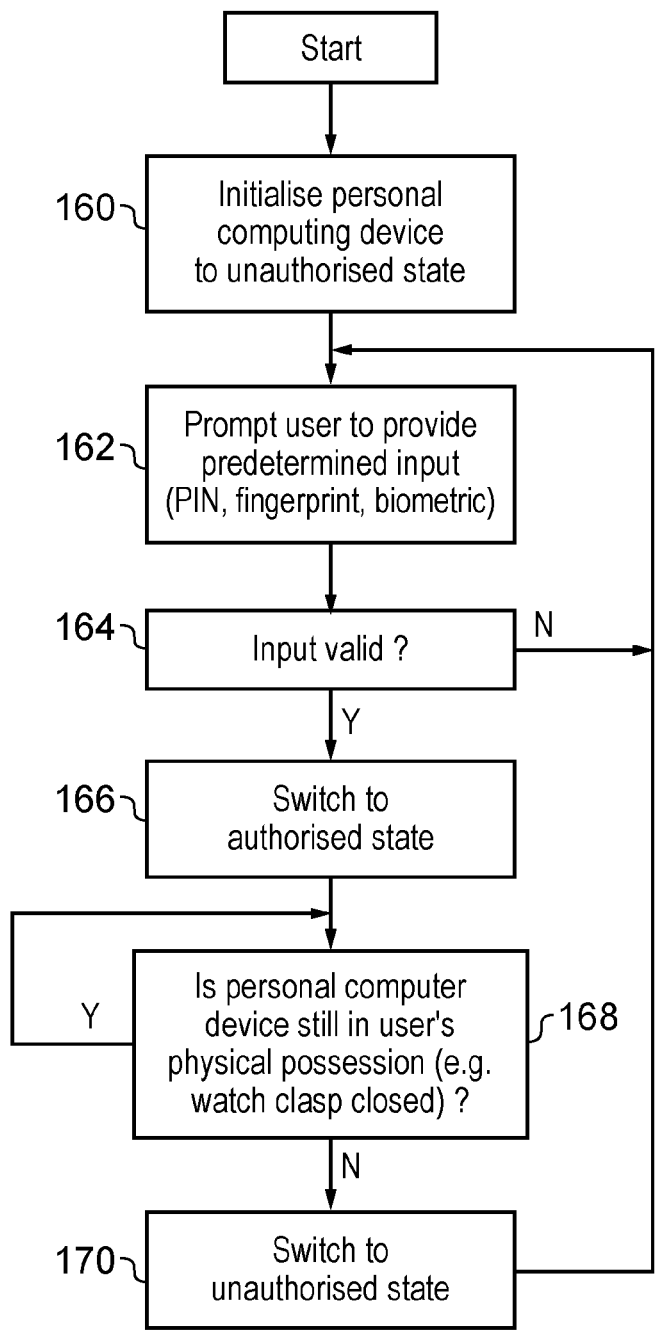
FIG. 11 is a flow diagram schematically illustrating authorized state switching by a personal computing device.

FIG. 11 is a flow diagram schematically illustrating authorized state switching performed by the personal computing device 12. At step 160 the personal computing device 12 is initialised into an authorized state. Step 162 then displays a prompt to the user to make a predetermined input in order to switch the personal computing device 12 from the unauthorized state to the authorized state. Such a predetermined input can take a variety of different forms, such as entering a personal identification number, scanning a fingerprint, scanning of another biometric parameter, or various other ways of validating a user.

Step 164 determines whether the user input at step 162 was valid. If the user input was not valid, processing returns to step 162 and the personal computing device 12 remains in the unauthorized state. If the input received at step 162 was valid, then step 166 serves to switch the personal computing device 12 from the unauthorized state to the authorized state. Processing then passes to step 168. Step 168 serves to continuously monitor that the personal computing device 12 remains under the user's physical possession. This can, for example, be carried out by monitoring the closure of the watch clasp 18 to ensure that this remains closed indicating that the watch strap 16 and the watch body 14 are attached to the user. Other forms of confirmation of physical possession are also possible, such as monitoring biometric parameters of the user, such as heart activity, characteristic motion etc. If the determination at step 168 at any time is that the personal computing device 12 has ceased to be in the continued physical possession of the user, then processing proceeds to step 170 where the personal computing device 12 is switched from the authorized state back to the unauthorized state and processing is returned to step 162.

Figure 12:
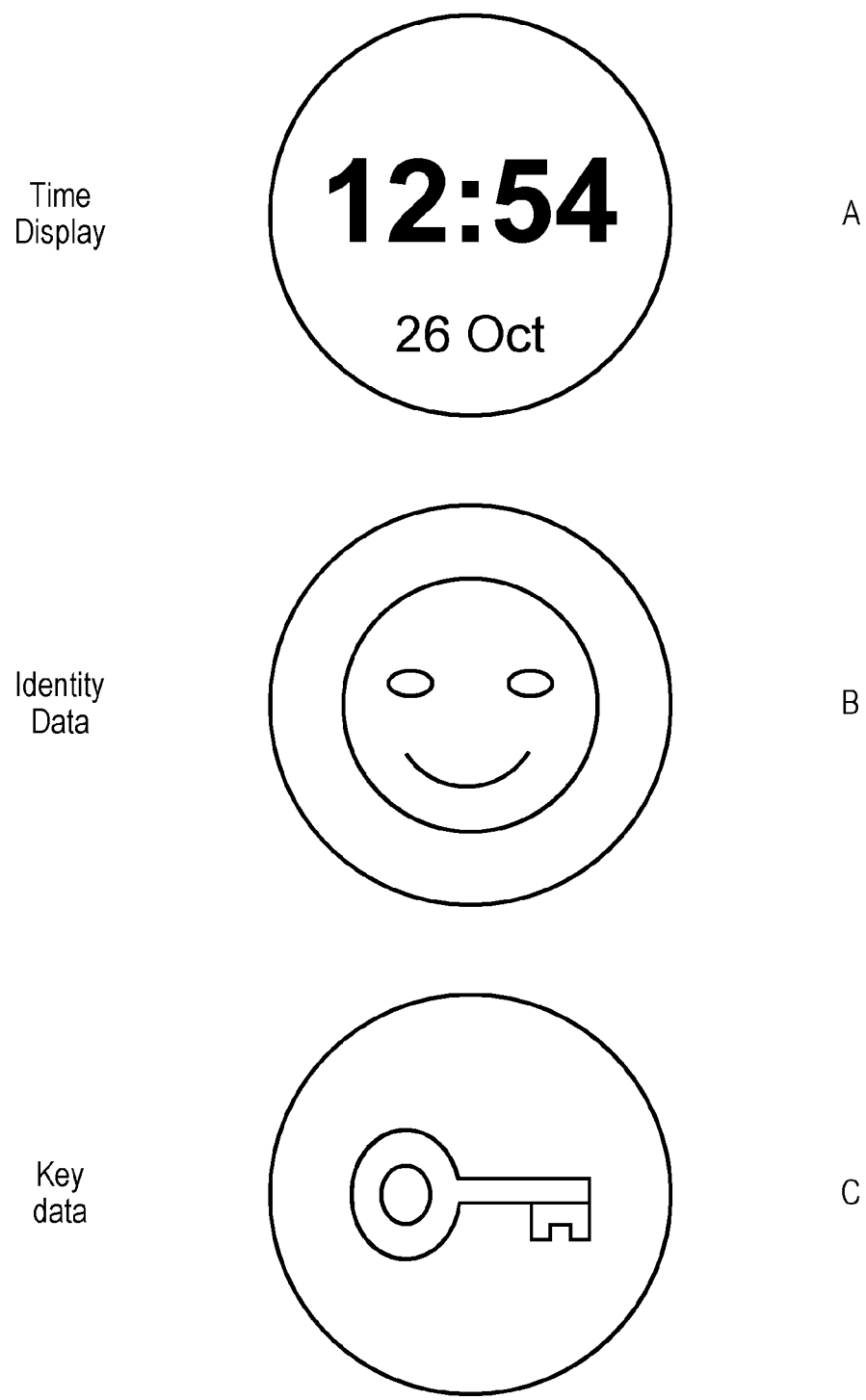
FIGS. 12A, 12B, and 12C and 13A, 13B, and 13C are block diagrams for icons displayed on a personal computing device to indicate the type of data being authorized and/or requested.

FIGS. 12A-12C, 13A-13C and 14 are block diagrams of displays which can be presented to the user on the personal computing device 12. FIG. 12A illustrates a normal time display when the personal computing device 12 is being used as a watch. FIG. 12B illustrates an icon which is displayed when identity data is being authorized for provision to the requester 4 or, at least requested. The use of a small set of known icons to represent the data being authorized allows the user to determine which actions are being taken by the personal computing device 12 and what data is being released to the requester 4. FIG. 12C illustrates an icon which is displayed when key data is being provided. This key data can be, for example, password data and username data of a wide variety of different forms used to control access to an account or service in one of many known ways.

Figure 13:
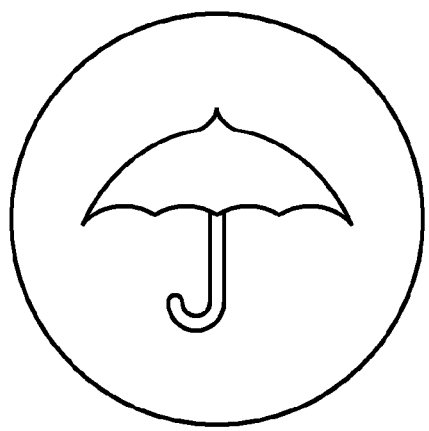
Figure 13:
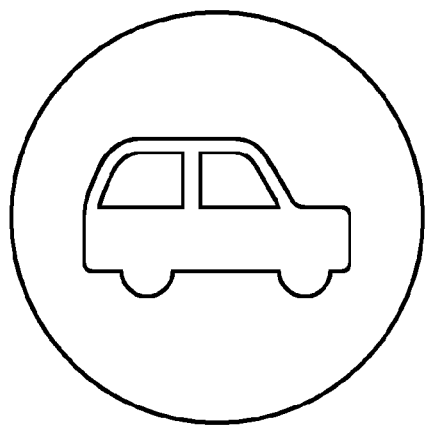
Figure 13:
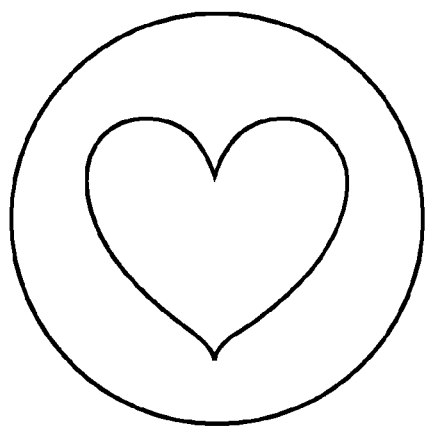

FIGS. 13 A, B, C respectively indicate icons displayed where the data authorized for provision is insurance data, vehicle related data and health data of the user. The data authorized for provision is stored by the third party device 6. Different types of data can be stored in different third party devices. For example, insurance data can be held within the web server of an insurance company whereas health data can be held within the web server of a health provider.

Figure 14:
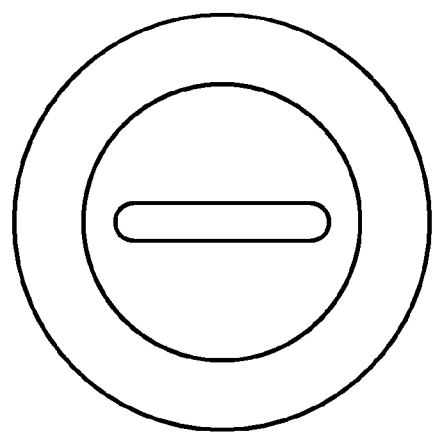
FIG. 14 is a block diagram for an icon indicating that a request has been refused.

FIG. 14 is a block diagram for an indication which is displayed to the user when a request for authorization to access data is refused. This icon is in the form of a no entry sign.

Figure 15:
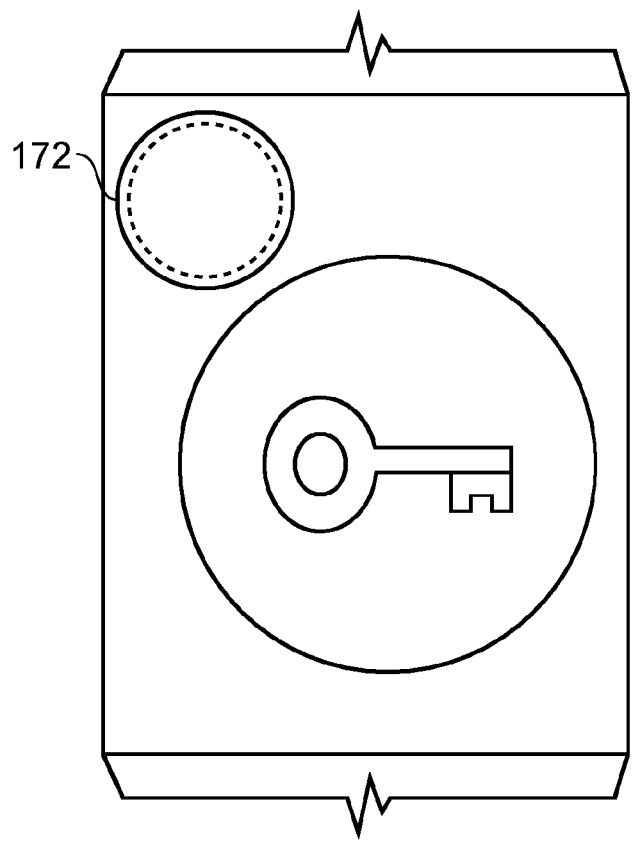
FIG. 15 is a block diagram for a wearable computing device in the form of a watch on which a user input is required in order to confirm authorization of a request for data.

FIG. 15 is a block diagram for a personal computing device 12 in the form of a smart watch in which an icon is displayed indicating that key data is potentially authorized for release (e.g. in response to an optionally authorized request). The personal computing device 12 includes a user activated button 172 which the user can press within a predetermined period to authorize the request for release of key data. The button 172 can be illuminated when a user input (or not) using the button is required.

The display of icons as illustrated in FIGS. 12, 13, 14 and 15 indicating the type of data to be released, provides a back channel of communication to the user of the personal computing device 12 to permit them to more readily understand the nature of the authorizations being requested and made.

The invention claimed is:
1. A method of controlling provision of data comprising:
storing within a terminal device one or more instances of login data within a login data store having a locked state and an unlocked state;
transmitting, from the terminal device onto which a user is logged, a request to access a service;
receiving a request for a target instance of login data from a requester and, if said login data store is in said unlocked state and said target instance of login data is stored within said login data store, then automatically providing said target instance of login data to said requester without requiring any user input;
detecting, at the terminal device, if a personal computing device is proximal to said terminal device and determining, at the terminal device, if said personal computing device is in an authorized state or an unauthorized state; and
if said personal computing device is proximal to said terminal device onto which the user is logged,
when said personal computing device is determined to be in said authorized state and said login data store is in said locked state, then switching said login data store from said locked state to said unlocked state, and when said login data store is in said unlocked state and said personal computing device switches from said authorized state to said unauthorized state, then switching said login data store from said unlocked state to said locked state.

2. A method as claimed in claim 1, comprising communicating via a two-way wireless communication connection between said personal computing device and said terminal device.

3. A method as claimed in claim 2, wherein said step of detecting detects proximity of said personal computing device to said terminal device based on a proximity metric determined based upon wireless signals.

4. A method as claimed in claim 1, comprising:
switching said personal computing device from an unauthorized state to said authorized state upon detecting a predetermined input from a user;
detecting if said personal computing device remains in physical possession of said user; and
if said personal computing device is detected as no longer being in physical possession of said user, then switching said personal computing device from said authorized state to said unauthorized state.

5. A method as claimed in claim 4, wherein said predetermined input from said user comprises at least one of:
recognition of a biometric parameter of said user;
recognition of a fingerprint of said user; and
input of a password by said user.

6. A method as claimed in claim 4, wherein said personal computing device is a wearable computing device attached to said user by an attachment mechanism having an open state and a closed state and said step of detecting if said personal computing device remains in physical possession of said user comprises detecting that said attachment mechanism remain in said closed state.

7. A method as claimed in claim 6, wherein said wearable computing device is a watch having a watch strap and said attachment mechanism is a mechanism for closing said watch strap around a wrist of said user.

8. A method as claimed in claim 1, wherein said login data store stores login data for web services to be accessed via said terminal device.

9. A terminal device for controlling provision of data, said terminal device comprising:
a login data store configured to store one or more instances of login data and having a locked state and an unlocked state;
circuitry to transmit, from the terminal device, a request to access a service when the user is logged onto the terminal device;
receiving circuitry configured to receive a request for a target instance of login data from a requester and, if said login data store is in said unlocked state and said target instance of login data is stored within said login data store, then automatically to provide said target instance of login data to said requester without requiring any user input;
detecting circuitry configured to detect if a personal computing device is proximal to said terminal device,
circuitry to determine if said personal computing device has an authorized state or an unauthorized state; and
switching circuitry configured:
if said personal computing device is proximal to said terminal device onto which the user is logged,
when said personal computing device is determined to be in said authorized state and said login data store is in said locked state, then to switch said login data store from said locked state to said unlocked state, and
when said login data store is in said unlocked state and said personal computing device switches from said authorized state to said unauthorized state, then to switch said login data store from said unlocked state to said locked state.

* * * * *